'United States Patent Office 3,736,267
Patented May 29, 1973

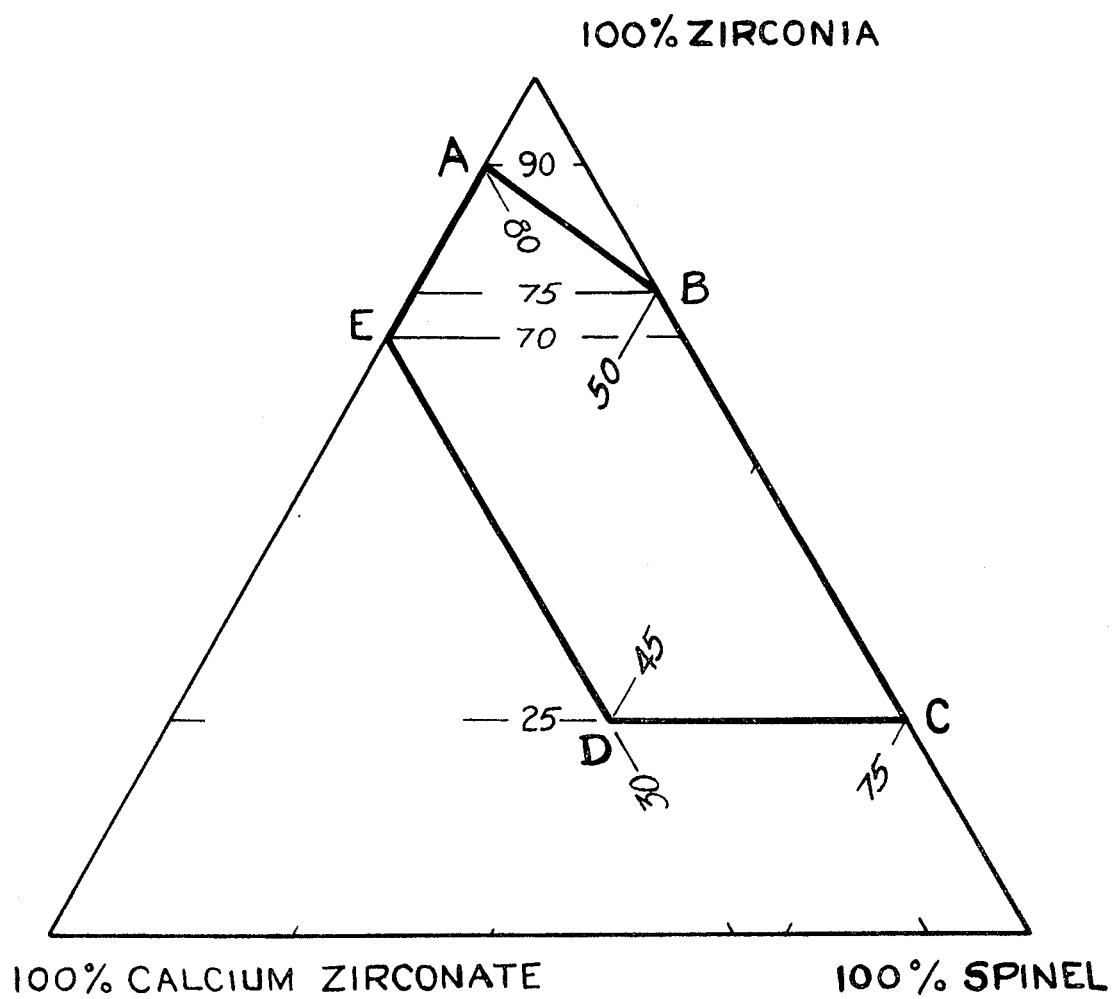

3,736,267
CATALYST AND CATALYST CARRIER
COMPOSITION
Ronald K. Bart, Sterling Junction, and Joseph R. Kiovsky, Worcester, Mass., assignors to Norton Company, Worcester, Mass.
Filed June 2, 1969, Ser. No. 829,323
Int. Cl. B01j 11/22
U.S. Cl. 252—466                     2 Claims

ABSTRACT OF THE DISCLOSURE

Spinel and calcium zirconate bonded zirconia shapes are an improved catalyst carrier for catalysts such as Co—CoO for use in steam reforming of hydrocarbons.

BACKGROUND OF THE INVENTION

This application relates to an improved catalyst composition for use, for example, in steam reforming of hydrocarbons to produce hydrogen, and to an improved catalyst carrier composition consisting of particulate zirconia bonded into shaped aggregates by calcium zirconate, mixtures of calcium zirconate with spinel and by spinel, i.e. magnesium aluminate, having the theoretical formula $MgO \cdot Al_2O_3$. Although the theoretical spinel contains two aluminum atoms for each magnesium atom, a wide variation in the mole ratio of aluminum to magnesium is possible with the material still crystallizing in the cubic spinel form. For the purposes of this invention, however, the mole ratio of Mg to Al must be 0.5 or greater, preferably between 0.5 and 0.65 exclusive of from 3 to 6% of a stabilizing oxide which may be MgO and which may be present in solid solution in the zirconia as a partial or complete stabilizing agent. Suitable stabilizing oxides are CaO, MgO, and certain rare earth oxides such as oxides of ceria and yttria.

While the standard catalyst for steam reforming of hydrocarbons to produce hydrogen has been nickel on an alumina carrier, recent improved catalysts have been described in the literature. For example, U.S. Pat. 1,119,-667 describes a catalyst which permits the use of olefinic feeds and low steam to carbon ratios without excessive carbon deposition on the catalyst, by employing alkalimetal additives to the nickel on alumina. U.S. Pat. 3,385,670 describes a cobalt on zirconia catalyst which also reduces carbon deposition but without the need for alkali promoters. The catalyst of 3,385,670 is costly however, because of the high temperature firing required to produce a suitable zirconia carrier, and because of the high cost of zirconia relative to alumina.

The carrier further suffers from an extremely high density, the theoretical density of zirconia being 5.6 grams per cubic centimeter, as opposed to 3.9 g./cc. for alumina. The high density increases shipping and handling costs and restricts the length to diameter ratio of packed beds of catalyst material due to the weight load near the bottom of the beds.

This invention achieves the beneficial results of the cobalt on zirconia catalyst while reducing its cost and its density, and provides an economical zirconia based carrier for metals such as iron, copper, cobalt, nickel, platinum, etc., and combinations such as bismuth-phospho-molybdates for oxidation, hydrogenation, dehydrogenation, and synthesis catalysts generally.

SUMMARY OF THE INVENTION

By substituting spinel for from 25 to 75% of the zirconia in the catalyst carrier, shaped aggregates can be formed by conventional ceramic techniques and fired at Orton cone 16 to produce a product having a strength equivalent to or better than the strength of zirconia bodies which must be fired at cone 35. The cone 16 firing represents a temperature around 1450° C., while the cone 35 firing represents a temperature around 1780° C. The difference in cost of such firings not only results from added fuel costs but also added costs in the materials of construction of the kiln for firing at cone 35.

Although, as indicated in the Van Hook Pat. 3,385,-670, there appears to be a "peculiar coaction" between the cobalt and the zirconia in the catalyst disclosed therein, we have found that dilution of the zirconia content by the presence in the carrier of as much as 75% by weight of spinel, does not seriously reduce the effect of the catalyst-catalyst carrier combination. For effective bonding we prefer to use 25% or more of spinel by weight. The fired product is a shape consisting of the starting particulate zirconia bonded into a monolithic shape by a continuous matrix of spinel, and includes sufficient porosity (30 to 60%) to be readily impregnated with the active catalytic material, e.g. cobalt or cobalt oxide. The fired catalyst carrier is, for example, dipped in an aqueous solution of a soluble cobalt salt such as cobalt nitrate, dried, and fired to convert the deposited salt to the oxide which subsequently is reduced or partially reduced to elemental cobalt; the final reduction step occurring, usually, in the steam reforming reactor.

While the present invention has particular utility in the steam reforming of hydrocarbons it has general utility as a support for Co—CoO catalyst systems or other catalytic metals which may be incompatible, under operating conditions, with alumina or other more conventional catalyst carrier materials.

As a substitute for some or all of the spinel bond, calcium zirconate, $CaZrO_3$, may be employed. When used without spinel the minimum calcium zirconate content to supply sufficient strength is 10% by weight. Up to 30% may be employed. Mixtures of spinel and calcium zirconate may be employed within the ranges shown in the area ABCDE of the accompanying drawing.

When calcium zirconate is used alone as a bond, firing temperatures as low as 1390° C. (cone 14) have been adequate. However, when employed with substantial amounts of spinel, the firing temperature should be 1450° C. or higher (cone 16).

The drawing shows a ternary diagram for the zirconia, calcium zirconate, spinel system in which the area ABCDE represents the operative compositions according to the present invention. In the diagram all percentages are by weight and point A is located at 90% zirconia, 10% calcium zirconate; point B is at 75% zirconia, 25% spinel; point C is at 25% zirconia, 75% spinel; point D is at 25% zirconia, 30% calcium zirconate, and 45% spinel; and point E is at 70% zirconia and 30% calcium zirconate. When 10% or more of the bond is calcium zirconate, we have found that in the impregnation step nitrate salts of metals such as cobalt are undesirable in that they cause a degradation of the bond. In such cases buffered salts or more neutral salts are preferred in the impregnation step.

DESCRIPTION OF THE PREFERRED EMBODIMENTS

The basic raw material required is zirconia in a form suitable for ceramic fabrication into shapes having adequate strength, a porosity suitable for use of the product as a catalyst carrier, and a surface area usually in the range of 1 m.²/gram or less. Fused, crushed zirconia is suitable and can be produced by methods known in the refractory art. The particle size of the grit is not critical but only must be coarse enough to be amenable to standard ceramic fabricating techniques to produce a suitable body for firing such as by molding or extrusion, and must not be so fine (i.e. like an impalpable powder)

that the desired porosity, surface area and strength are not achieved in the final product.

The spinel bonding material can be prepared by reacting together alumina and magnesia in any desired manner such as by heating together a source of alumina (such as aluminum hydroxide) or alumina powder and a source of magnesia such as magnesium carbonate or magnesium hydroxide. A particularly suitable and inexpensive source of spinel commercially available is that made by fusion in an electric arc furnace. The spinel can be of very fine particle size and should not be coarser than the zirconia material.

The calcium zirconate bonding material can be preformed calcium zirconate or the bond can be formed in situ by employing calcium oxide or a source of calcium oxide such as calcium carbonate with the proper stoichiometric amount of zirconia, separate from the granular zirconia of the body.

Other materials may be employed in the fabrication of carrier shapes such as lubricants (for extrusion processes), temporary binders, organic burnout materials, and plasticizers. Conventional materials known to the ceramic art are suitably employed as in the following examples.

EXAMPLE I

A mixture of 50 parts by weight of fused zirconia grain, 90F, including 3% CaO as a stabilizing agent, and 50 parts of magnesium aluminate, 100 mesh and finer, having a magnesium to aluminum ratio of 1, is mixed with 2 parts by weight of cereal starch and 10 parts of water. The resulting mix is pressed at ½ ton/sq. inch to shape and fired to cone 16.

EXAMPLES II-VIII

A preferred method of forming is by extrusion. In such cases a lubricant is required in the mix. A desirable shape is a ⅝-inch by ⅝-inch cylinder having a ⅜-inch central hole. The general method is as follows:

Weighing and blending

All dry ingredients, i.e. the basic grain, the bond and the dry organic plasticizers and lubricants are weighed out, placed in a mixer, and dry blended for a period of from 5 to 10 minutes.

Mixing

In the mixing step, grease is added and water is added in the amount of from 3 to 8% depending upon the operator's judgment as to a suitable consistency for extrusion. To the dry ingredients is added about two-thirds of the expected water required and the mixing is continued for an additional five minutes. At this point, the grease, 2% by weight, is added (for example, Texaco cup grease No. GB-2) together with 1% of hydroxypropyl methyl cellulose powder, and mixing continued for another two minutes at which point water is added to give the desired consistency and mixing is continued for an additional 5 to 15 minutes.

After extrusion the shapes are dusted with dry corn meal to prevent sticking and then dried and fired. Suitable compositions (omitting the organics) are as follows:

| Example | Zirconia grain | Calcium zirconate | Spinel | Firing |
|---|---|---|---|---|
| II | 90 | 10 | | Cone 14 (1,390°C.). |
| III | 50 | | 50 | Cone 16 (1,450° C.). |
| IV | 25 | | 75 | Cone 16. |
| V | 75 | | 25 | Do. |
| VI | 85 | 6 | 9 | Do. |
| VII | 25 | 30 | 45 | Do. |
| VIII | 70 | 30 | | Cone 14. |

What is claimed is:

1. A catalyst carrier aggregate of at least 25% by weight of particulate zirconia bonded into a monolithic shape by a bond consisting of a material selected from the group consisting of magnesium aluminate spinel, and calcium zirconate and mixtures thereof, the spinel having an atomic ratio of Mg to Al of between 0.5 and 0.65, said monolithic shape having a composition in the area ABCDE represented in the accompanying drawing and having a porosity of from 30 to 60%, by volume, and a surface area of less than one square meter per gram.

2. A catalyst for use in steam reforming of hydrocarbons consisting of a cobalt component selected from the group consisting of elemental cobalt, cobalt oxide, and mixtures thereof on a carrier consisting of a monolithic shape of bonded zirconia grain, said shape having an overall composition of zirconia, and a bond selected from the group consisting of calcium zirconate and magnesium aluminate spinel in the area ABCDE represented in the accompanying drawing.

References Cited

UNITED STATES PATENTS

| | | | |
|---|---|---|---|
| 3,457,192 | 7/1969 | Housset | 252—457 |
| 3,368,982 | 2/1968 | Milbourne | 252—466 |
| 3,436,358 | 4/1969 | Thygesen | 252—466 |
| 3,385,670 | 5/1968 | Van Hook | 23—212 |

DANIEL E. WYMAN, Primary Examiner

W. J. SHINE, Assistant Examiner

U.S. Cl. X.R.

252—463, 475